US007933613B2

(12) United States Patent
Willey

(10) Patent No.: US 7,933,613 B2
(45) Date of Patent: *Apr. 26, 2011

(54) METHODS AND APPARATUS FOR TERMINATING USE OF QUICK PAGING CHANNEL BASED ON HIGH CAPACITY POWER SOURCE USAGE

(75) Inventor: William Daniel Willey, San Francisco, CA (US)

(73) Assignee: Research In Motion Limited, Waterloo, Ontario (CA)

( * ) Notice: Subject to any disclaimer, the term of this patent is extended or adjusted under 35 U.S.C. 154(b) by 434 days.

This patent is subject to a terminal disclaimer.

(21) Appl. No.: 11/955,008

(22) Filed: Dec. 12, 2007

(65) Prior Publication Data
US 2008/0096585 A1 Apr. 24, 2008

Related U.S. Application Data

(63) Continuation of application No. 11/007,370, filed on Dec. 8, 2004, now Pat. No. 7,333,821.

(60) Provisional application No. 60/527,865, filed on Dec. 8, 2003.

(51) Int. Cl.
*H04W 68/00* (2009.01)
*H04B 7/00* (2006.01)

(52) U.S. Cl. ........ 455/458; 455/515; 455/434; 370/345; 370/342; 370/343

(58) Field of Classification Search .......... 455/572–574, 455/436, 343, 515, 458, 434
See application file for complete search history.

(56) References Cited

U.S. PATENT DOCUMENTS

| | | | |
|---|---|---|---|
| 5,511,110 A | 4/1996 | Drucker | |
| 5,533,094 A | 7/1996 | Sanmugam | |
| 5,745,695 A | 4/1998 | Gilchrist et al. | |
| 5,870,685 A | 2/1999 | Flynn | |
| 5,991,600 A | 11/1999 | Anderson et al. | |

(Continued)

FOREIGN PATENT DOCUMENTS
DE 19707261 C1 4/1998
(Continued)

OTHER PUBLICATIONS

International Preliminary report on Patentability for PCT application # PCT/US2004/040846, Dated Oct. 11, 2006.

(Continued)

*Primary Examiner* — Charles N Appiah
*Assistant Examiner* — Emem Stephen
(74) *Attorney, Agent, or Firm* — John J. Oskorep, Esq.

(57) ABSTRACT

In one illustrative example, a method of monitoring for pages in a wireless communication network by a mobile communication device adapted to operate with a battery power source includes the steps of repeatedly monitoring a quick paging channel of the wireless network for quick pages and, if a quick page is received on the quick paging channel, subsequently monitoring a paging channel of the wireless network for an upcoming page; identifying whether an external power source is connected to the mobile device; and if the external power source is identified as being connected to the mobile device: causing an indication to terminate use of quick paging to be sent to the wireless network and, after sending the indication, repeatedly monitoring the paging channel of the wireless network for pages.

37 Claims, 6 Drawing Sheets

U.S. PATENT DOCUMENTS

| | | | |
|---|---|---|---|
| 6,091,960 | A | 7/2000 | Raith et al. |
| 6,094,426 | A | 7/2000 | Honkasalo et al. |
| 6,111,865 | A | 8/2000 | Butler et al. |
| 6,278,703 | B1 | 8/2001 | Neufeld |
| 6,307,846 | B1 | 10/2001 | Willey |
| 6,421,540 | B1 | 7/2002 | Gilhousen et al. |
| 6,509,827 | B1 | 1/2003 | Berstis et al. |
| 6,522,873 | B1 * | 2/2003 | Moles et al. ............... 455/343.1 |
| 6,542,517 | B1 | 4/2003 | Giacalone |
| 6,600,731 | B2 | 7/2003 | Menzel et al. |
| 6,636,745 | B2 | 10/2003 | Oprescu-Surcobe et al. |
| 6,665,307 | B1 | 12/2003 | Rydnell et al. |
| 6,822,973 | B2 * | 11/2004 | Kelley et al. |
| 7,333,821 | B2 | 2/2008 | Willey |
| 7,346,019 | B2 | 3/2008 | Willey et al. |
| 2003/0008691 | A1 * | 1/2003 | Chen et al. ..................... 455/574 |
| 2003/0054820 | A1 | 3/2003 | Kang et al. |
| 2004/0157626 | A1 | 8/2004 | Park et al. |
| 2005/0118981 | A1 | 6/2005 | Laroia et al. |
| 2005/0201311 | A1 * | 9/2005 | Willey et al. |
| 2009/0131083 | A1 | 5/2009 | Willey et al. |

FOREIGN PATENT DOCUMENTS

| | | | |
|---|---|---|---|
| WO | 9534178 | A1 * | 12/1995 |
| WO | 9838818 | A3 | 9/1998 |
| WO | 0059225 | A1 * | 10/2000 |
| WO | 03026337 | A | 3/2003 |

OTHER PUBLICATIONS

International Preliminary report on Patentability for PCT application # PCT/IB2004/004442, Dated May 31, 2006.
Search Report and Written Opinion for PCT application # PCT/US2004/040846, Dated Jul. 14, 2006.
Search Report and Written Opinion for PCT application # PCT/IB2004/004442, Dated. Oct. 11, 2005.
Search Report and Written Opinion for EP application # 04817019.5, Dated May 2, 2007.
Search Report and Written Opinion for EP application # , 04820860.7 Dated May 16, 2007.
Canadian Office Action for Application No. 2,529,679, Jul. 29, 2009.
European Search Report for EPO Patent Application #04821277.3, Jul. 6, 2006.
European Search Report for EPO Patent Application #04817019.5, Apr. 18, 2007.
International Search Report and Written Opinion for PCT Application #PCT/IB2004/004443, Nov. 28, 2005.
International Preliminary Report on Patentability for PCT Application #PCT/IB2004/004443, May 23, 2006.
Agashe et al., "Expanded Sleep Timer", Oct. 2003, pp. 2-3 to 2-27, C25-20030625-001, Qualcomm Inc.
Cherian et al., "Eliminate Support of QPCH While Operating in the Reduced Slotted Mode", 3GPP2 XP-002416461, Oct. 13, 2003.

* cited by examiner

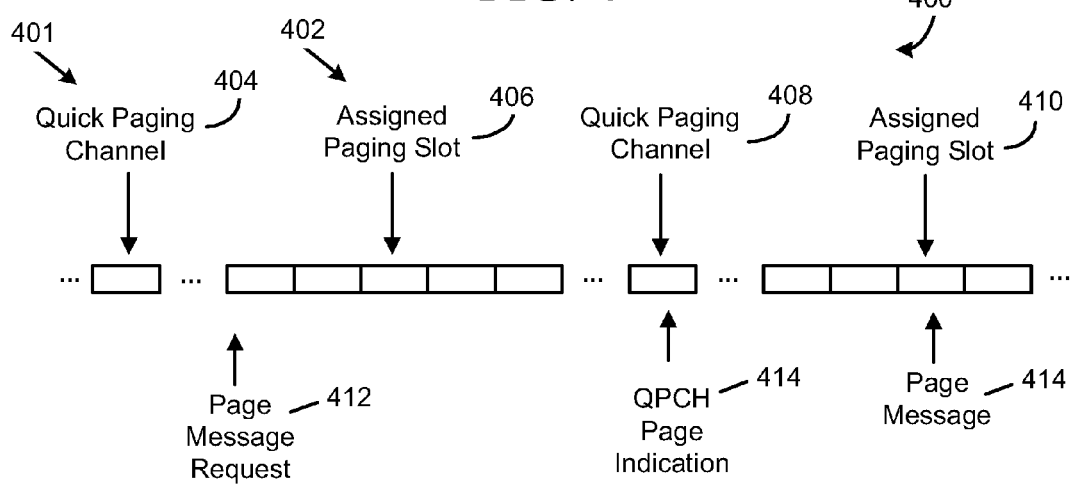
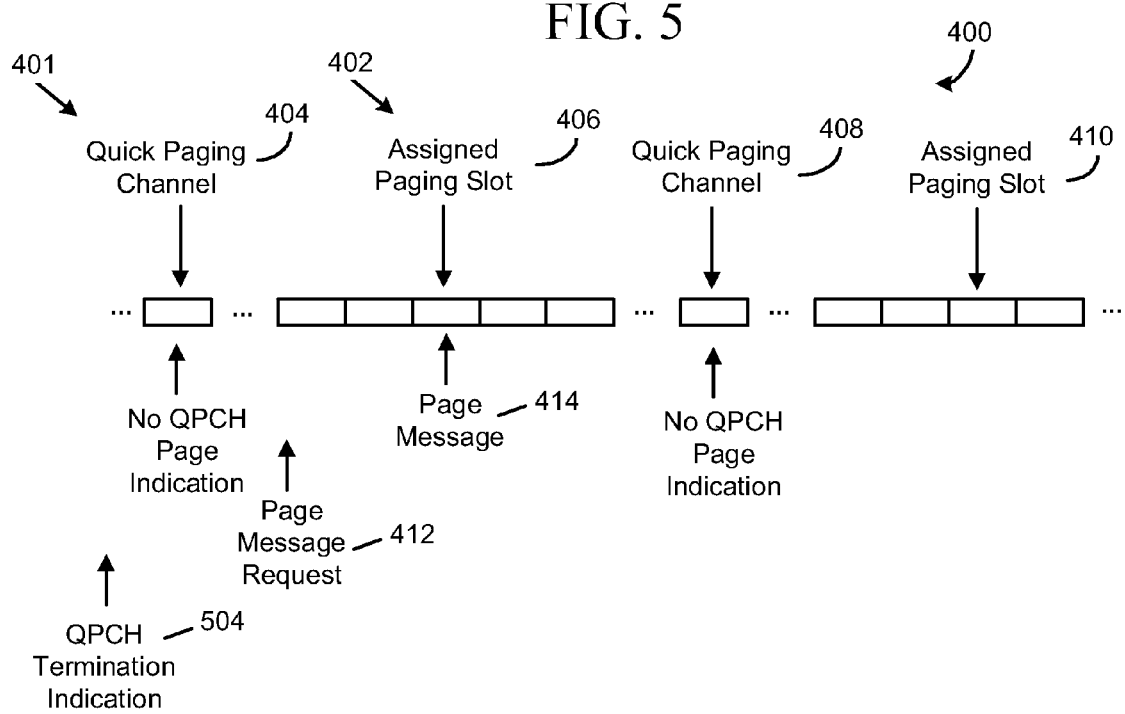

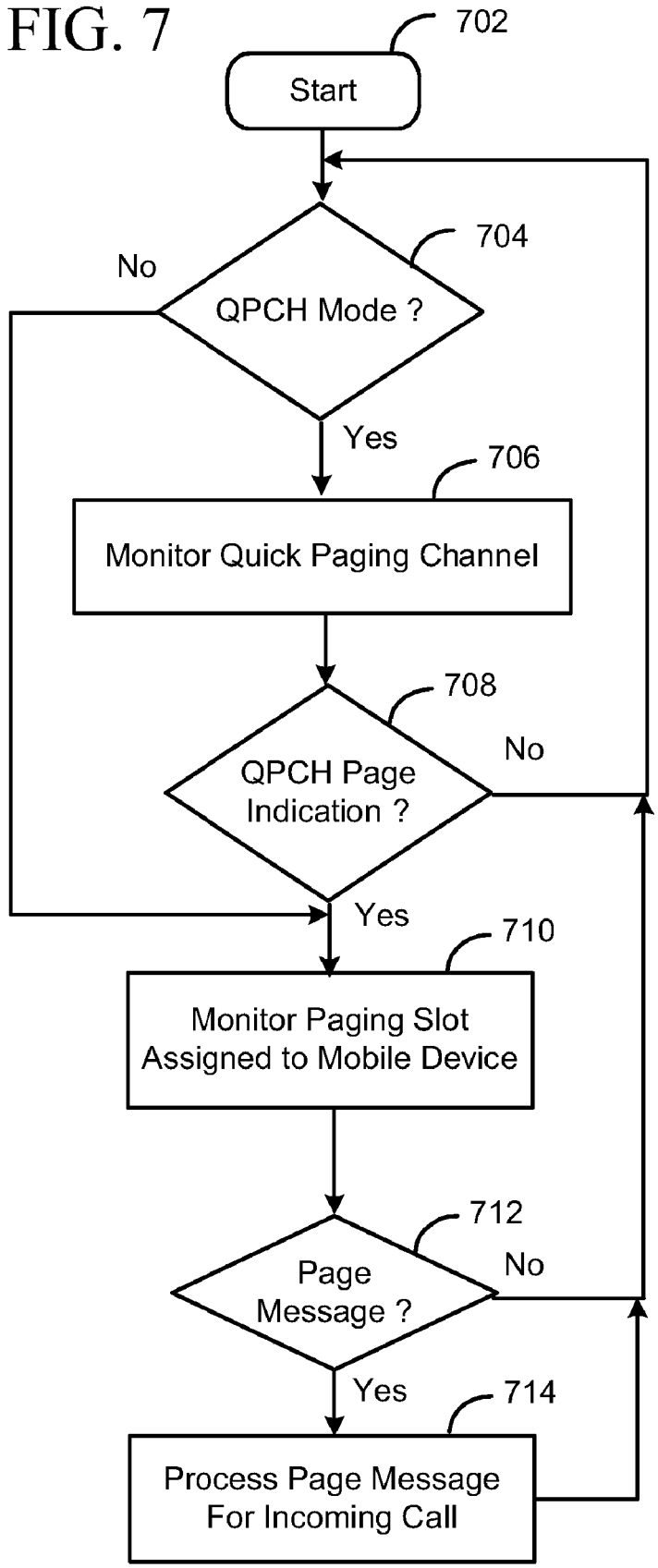

METHODS AND APPARATUS FOR TERMINATING USE OF QUICK PAGING CHANNEL BASED ON HIGH CAPACITY POWER SOURCE USAGE

CROSS-REFERENCE TO RELATED APPLICATIONS

This application is a continuation of and claims priority to U.S. Non-Provisional Application having application Ser. No. 11/007,370 and filing date of 8 Dec. 2004, now U.S. Pat. No. 7,333,821, which is a non-provisional application of U.S. Provisional Patent Application having application No. 60/527,865 and filing date of 8 Dec. 2003, each application being hereby incorporated by reference herein.

BACKGROUND

1. Field of the Technology

The present application relates generally to mobile stations operating in a wireless communication network, and more particularly to methods and apparatus for terminating use of a quick paging channel (QPCH) based on high capacity power source usage.

2. Description of the Related Art

A wireless communication device, such as a mobile station operating in a cellular telecommunications network, may provide for both voice telephony and data communications. A mobile station may, for example, be compatible with $3^{rd}$ Generation (3G) communication standards (such as IS-2000 Release 0) and utilize Global System for Mobile Communications (GSM), Time Division Multiple Access (TDMA), or Code Division Multiple Access (CDMA) wireless network technologies.

In CDMA communications defined by IS-2000, a quick paging channel (QPCH) is utilized to provide an early indication to a mobile device of whether or not a page message will be present in an upcoming paging slot assigned to the mobile device. The quick paging channel is relatively short in comparison to the upcoming paging slot, so if the indication indicates that no page message will be present, the mobile device does not have to monitor the upcoming paging slot. As apparent, the quick paging channel indication is intended to save power at the mobile device, which no longer has to always repeatedly monitor each assigned paging slot for a page. If the mobile device determines that the quick paging channel indication may be inaccurate, however, the mobile device will still monitor its associated upcoming paging slot.

The quick paging channel utilizes an ON-OFF keying technique. When a relatively large number of mobile devices are operating in the network, indication "collisions" are more likely to occur which causes the quick paging channel indication to become less accurate for use in the mobile device. This causes all mobile devices in the network to have to monitor the paging slots more often. In brief, the more mobile devices utilizing the quick paging channel in the network, the more likely there will be collisions to render any given quick paging channel indication to be inaccurate, and therefore the more likely mobile devices in the network will have to monitor paging slots which increases power consumption for all mobile stations.

Note also that the quick paging channel is provided about 100 milliseconds before an upcoming paging slot for the mobile device. The network must therefore provide the indication and then delay 100 milliseconds prior to actually sending any page message to the mobile device. Thus, this increases the time for the network to send certain page messages to the mobile device, which increases call setup time for the mobile device.

Other systems may exhibit similar problems. Accordingly, what are needed are improved techniques for paging in wireless communication networks.

BRIEF DESCRIPTION OF THE DRAWINGS

Embodiments of present application will now be described by way of example with reference to attached figures, wherein:

FIG. 4 is an illustrative representation of message slots for the communication of page messages to the mobile device;

FIG. 5 is an illustrative representation of message slots for the communication of page messages to the mobile device, with use of a quick paging channel termination indication;

FIG. 7 is a flowchart for describing a mobile device method of operating with use of terminated quick paging channel modes.

DETAILED DESCRIPTION OF THE PREFERRED EMBODIMENTS

When a mobile device is utilizing a high capacity power source which is different than its normal battery source, it sends an indication to the network to terminate use of the quick paging channel for the mobile device. The high capacity power source may be, for example, an AC wall power source or charger, a battery charger, a computer power source via Universal Serial Bus (USB), etc. When utilizing such a power source, the mobile device does not have a strong need to conserve power. The two advantages are that (1) a reduction in the potential for collisions for quick paging indications which generally reduces the power consumption for all mobile stations in the network; and (2) a decreased call setup time for the mobile device.

To illustrate, a mobile communication device has a wireless transceiver; an antenna coupled to the wireless transceiver; one or more processors coupled to the wireless transceiver; and a power source interface which is adapted to connect with a power source for supplying electrical power to the mobile device. The one or more processors are operative to monitor a quick paging channel of a wireless communication network with use of the wireless transceiver; identify whether a predetermined power source is connected to the power source interface; cause an indication to terminate use of the quick paging channel to be transmitted with the wireless transceiver to the wireless network based on identifying that the predetermined power source is connected to the power source interface; and refrain from monitoring the quick paging channel with the wireless transceiver after sending the indication to the wireless network.

Figure 1:
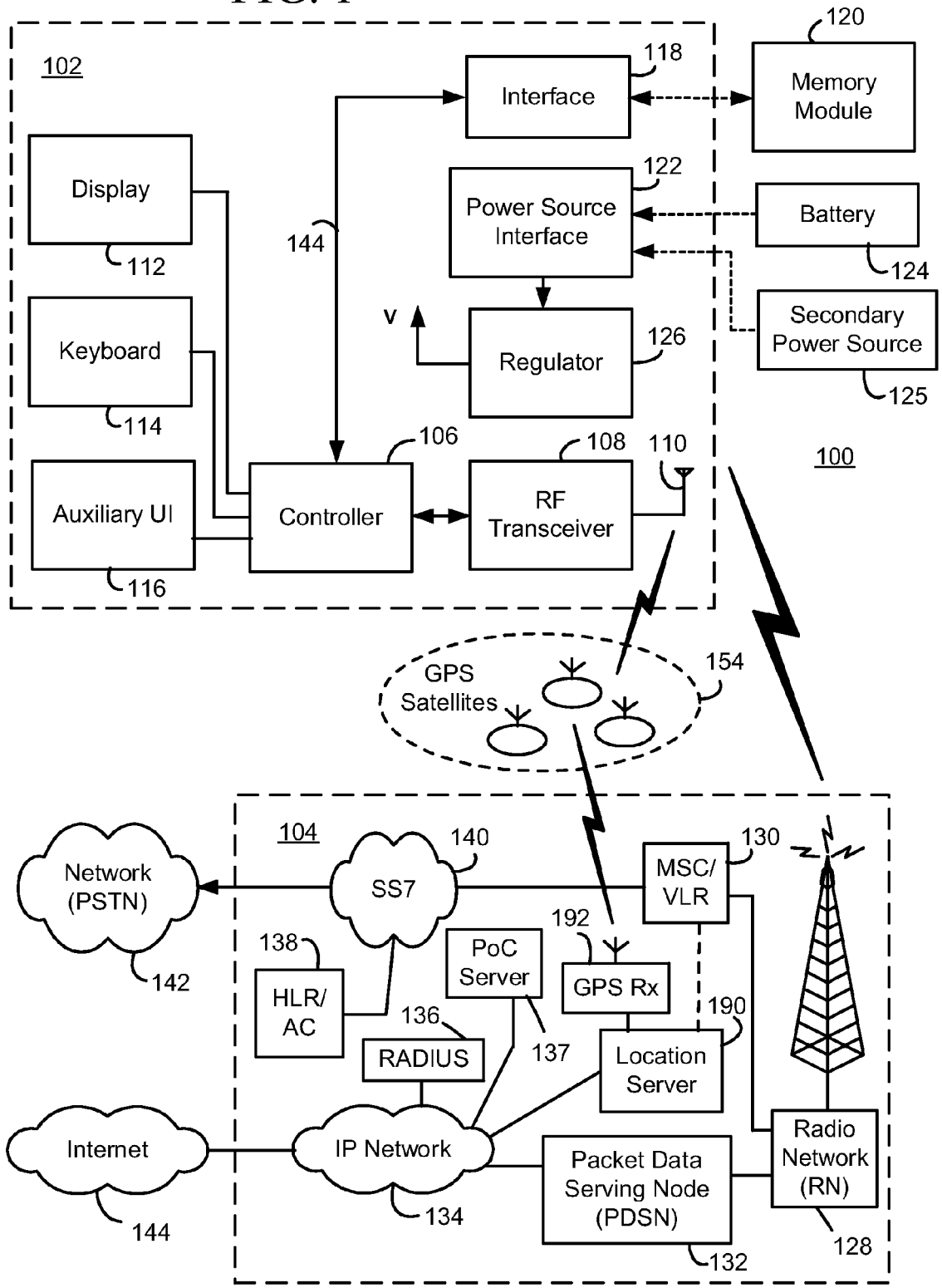
FIG. 1 is a block diagram which illustrates pertinent components of a mobile communication device and a wireless communication network.

FIG. 1 is a block diagram of a communication system 100 which includes a mobile communication device 102 which communicates through a wireless communication network 104. Mobile device 102 preferably includes a visual display 112, a keyboard 114, and perhaps one or more auxiliary user interfaces (UT) 116, each of which is coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile device 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile device 102, information for transmission to network 104, a telephone number to place a telephone call, commands to be executed on mobile device 102, and possibly other or different user inputs.

Mobile device 102 sends communication signals to and receives communication signals from network 104 over a wireless link via antenna 110. RF transceiver circuitry 108 performs functions similar to those of a radio network (RN) 128, including for example modulation/demodulation and possibly encoding/decoding and encryption/decryption. It is also contemplated that RF transceiver circuitry 108 may perform certain functions in addition to those performed by RN 128. It will be apparent to those skilled in art that RF transceiver circuitry 108 will be adapted to particular wireless network or networks in which mobile device 102 is intended to operate. When mobile device 102 is fully operational, an RF transmitter of RF transceiver circuitry 108 is typically turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile device 102 includes a power source interface 122 for receiving one or more rechargeable batteries 124. Battery 124 provides electrical power to electrical circuitry in mobile device 102, and power source interface 122 provides for a mechanical and electrical connection for battery 124. Power source interface 122 is coupled to a regulator 126 which regulates power to the device. Power source interface 122 is also adapted to connect with a secondary power source 125. Secondary power source 125 is a larger or higher capacity power source than battery 124. Secondary power source 125 provides an indefinite supply of power to mobile device 102. Secondary power source 125 may be, for example, an AC wall power source, an automobile power source through a "cigarette lighter" or other suitable connection, or a PC power source through a Universal Serial Bus (USB) connection.

Mobile device 102 operates using a memory module 120, such as a Subscriber Identity Module (SIM) or a Removable User Identity Module (R-UIM), which is connected to or inserted in mobile device 102 at an interface 118. As an alternative to a SIM or an R-UIM, mobile device 102 may operate based on configuration data programmed by a service provider into a non-volatile memory of mobile device 102. Mobile device 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile device 102 may be a multiple-module unit comprising a plurality of separate components, including but in no way limited to a computer or other device connected to a wireless modem. In particular, for example, in the mobile device block diagram of FIG. 1, RF transceiver circuitry 108 and antenna 110 may be implemented as a radio modem unit that may be inserted into a port on a laptop computer. In this case, the laptop computer would include display 112, keyboard 114, and one or more auxiliary UIs 116. Controller 106 is either embodied as the computer's CPU or a separate CPU within the modem unit. It is also contemplated that a computer or other equipment not normally capable of wireless communication may be adapted to connect to and effectively assume control of RF transceiver circuitry 108 and antenna 110 of a single-unit device such as one of those described above. Such a mobile device 102 may have a more particular implementation as described later in relation to mobile station 202 of FIG. 2.

Mobile device 102 communicates in and through wireless communication network 104. In the embodiment of FIG. 1, wireless network 104 is a Second Generation (2G) or Third Generation (3G) supported network based on Code Division Multiple Access (CDMA) technologies. In particular, wireless network 104 is a CDMA2000® network which includes fixed network components coupled as shown in FIG. 1. Wireless network 104 of the CDMA2000-type includes a Radio Network (RN) 128, a Mobile Switching Center (MSC) 130, a Signaling System 7 (SS7) network 140, a Home Location Register/Authentication Center (HLR/AC) 138, a Packet Data Serving Node (PDSN) 132, an IP network 134, and a Remote Authentication Dial-In User Service (RADIUS) server 136. SS7 network 140 is communicatively coupled to a network 142 (such as a Public Switched Telephone Network or PSTN) which may connect mobile device 102 with other call parties such as a call party 150 (e.g. a landline telephone or other mobile station) or an emergency call center 152. On the other hand, IP network 134 is communicatively coupled to another network 144 such as the Internet. Note that CDMA2000® is a registered trademark of the Telecommunications Industry Association (TIA-USA).

During operation, mobile device 102 communicates with RN 128 which performs functions such as call-setup, call processing, and mobility management. RN 128 includes a plurality of base station transceiver systems that provide wireless network coverage for a particular coverage area commonly referred to as a "cell". A given base station transceiver system of RN 128, such as the one shown in FIG. 1, transmits communication signals to and receives communication signals from mobile devices within its cell. The base station transceiver system normally performs such functions as modulation and possibly encoding and/or encryption of signals to be transmitted to the mobile device in accordance with particular, usually predetermined, communication protocols and parameters, under control of its controller. The base station transceiver system similarly demodulates and possibly decodes and decrypts, if necessary, any communication signals received from mobile device 102 within its cell. Communication protocols and parameters may vary between different networks. For example, one network may employ a different modulation scheme and operate at different frequencies than other networks. The underlying services may also differ based on its particular protocol revision.

The wireless link shown in communication system 100 of FIG. 1 represents one or more different channels, typically different radio frequency (RF) channels, and associated protocols used between wireless network 104 and mobile device 102. Those skilled in art will appreciate that a wireless network in actual practice may include hundreds of cells depending upon desired overall expanse of network coverage. All pertinent components may be connected by multiple switches and routers (not shown), controlled by multiple network controllers.

For all mobile device's 102 registered with a network operator, permanent data (such as mobile device 102 user's profile) as well as temporary data (such as mobile device's 102 current location) are stored in a HLR/AC 138. In case of a voice call to mobile device 102, HLR/AC 138 is queried to determine the current location of mobile device 102. A Visitor Location Register (VLR) of MSC 130 is responsible for a group of location areas and stores the data of those mobile devices that are currently in its area of responsibility. This includes parts of the permanent mobile device data that have been transmitted from HLR/AC 138 to the VLR for faster access. However, the VLR of MSC 130 may also assign and store local data, such as temporary identifications. Mobile device 102 is also authenticated on system access by HLR/AC 138. In order to provide packet data services to mobile device 102 in a CDMA2000-based network, RN 128 communicates with PDSN 132. PDSN 132 provides access to the Internet 144 (or intranets, Wireless Application Protocol (WAP) servers, etc.) through IP network 134. PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

Wireless communication network 104 includes position tracking components for tracking the locations of mobile devices. Location information of mobile devices are obtained based on Global Positioning System (GPS) techniques utilizing GPS satellites of a conventional GPS system 154. In the typical configuration, GPS system 154 includes twenty-four (24) GPS satellites that circle the earth every twelve (12) hours. In the present application, mobile device 102 obtains GPS information based on signals received from GPS system 154 and utilizes a location server 190 in wireless network 104 to measure and obtain its location. Location server 190 is connected to MSC 130 and/or IP network 134 and may include what is referred to as a Position Determination Entity (PDE). The PDE is coupled to a GPS receiver 192 for receiving signals and decoding information transmitted by GPS system 154. Mobile device 102 is able to receive GPS information from GPS system 154 and location server 190 using the same RF transceiver 108 utilized for typical voice and data communications (or by sharing at least a portion thereof).

Those skilled in art will appreciate that wireless network 104 may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
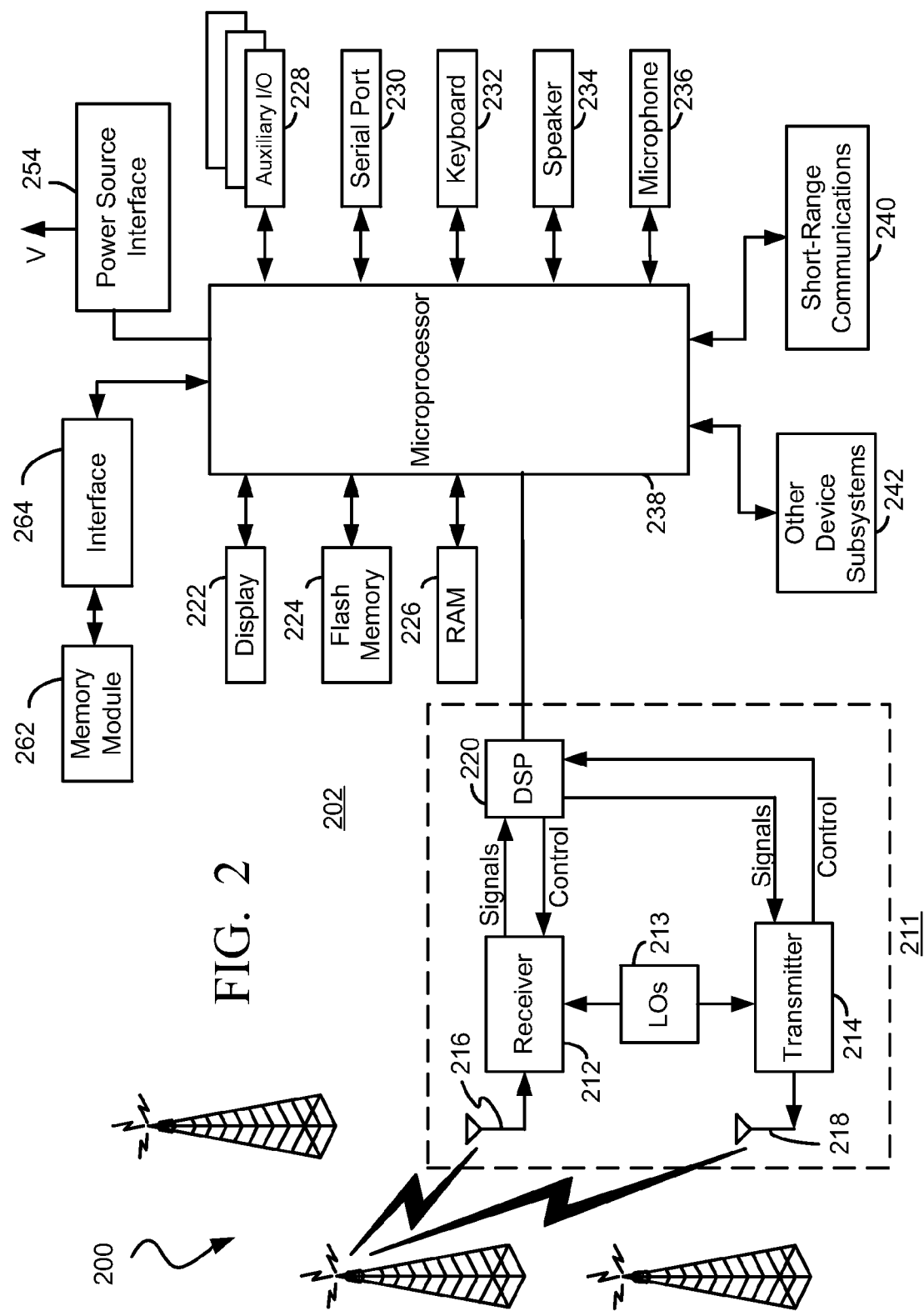
FIG. 2 is a more detailed diagram of a preferred mobile device of FIG. 1, namely a mobile station.

FIG. 2 is a detailed block diagram of a preferred mobile device, namely a mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities).

Mobile station 202 may communicate with any one of a plurality of base station transceiver systems 200 within its geographic coverage area. Mobile station 202 selects or helps select which one of base station transceiver systems 200 it will communicate with.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a memory module 262, such as a Subscriber Identity Module or "SIM" card or a Removable User Identity Module (R-UIM), to be inserted in or connected to an interface 264 of mobile station 202 in order to operate in the network. Alternatively, a portion of the non-volatile memory or flash memory 224 is programmed with configuration data by a service provider so that mobile station 202 may operate in the network.

Since mobile station 202 is a portable battery-powered device, it also includes a power source interface 254 for receiving different power sources such as a battery or a secondary power source (described in relation to FIG. 1). Such a power source provides electrical power to most if not all electrical circuitry in mobile station 202, and interface 254 provides for a mechanical and electrical connection for it. Power source interface 254 is coupled to a regulator (not shown in FIG. 2) which provides power to all of the circuitry.

Mobile station 202 includes a microprocessor 238 (which is one implementation of controller 106 of FIG. 1) which controls overall operation of mobile station 202. This control includes quick paging techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG.

Figure 3:
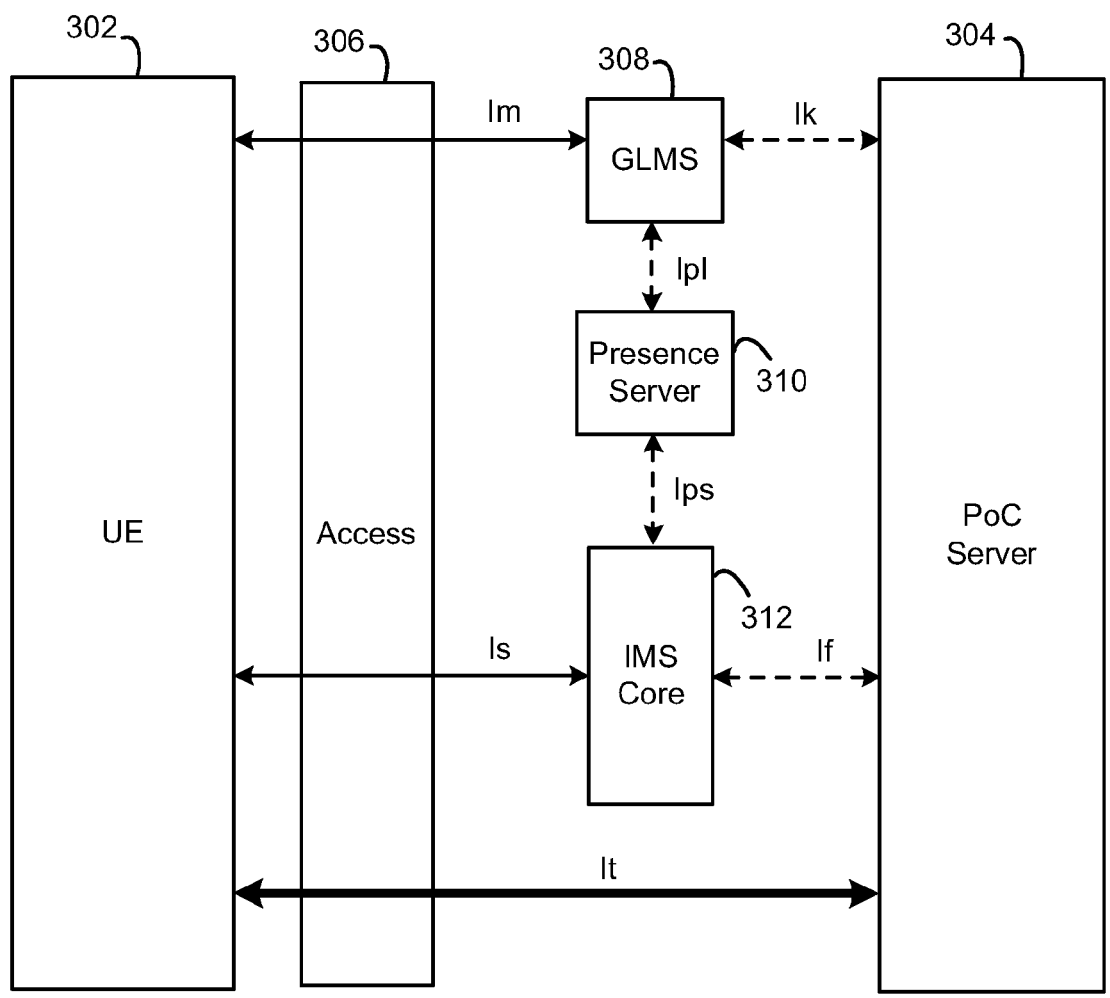
FIG. 3 is a block diagram of system components pertaining to Push-to-talk (PTT) over Cellular (PoC) communication sessions for the mobile device.

FIG. 3 is a block diagram of relevant system components 300 pertaining to Push-to-talk (PTT) over Cellular (PoC) communications which the mobile device may utilize. System components 300 include user equipment (UE) 302 which represents a mobile device, a Push-to-talk over Cellular (PoC) server 304, an access 306, a Group and List Management Server (GLMS) 308, an IP Multimedia Subsystem (IMS) core 312, and a presence server 310. Some of these components may be optional or not necessary for fundamental operation. The PoC architecture and signaling may be the same as is conventional as described in current standard specifications such as Push-to-talk over Cellular (PoC), Architecture, PoC Release 1.0—Architecture V1.1.0 (2003-08) Technical Specification; and Push-to-talk over Cellular (PoC), Signaling Flows, PoC Release 1.0—Signaling Flows V1.1.3 (2003-08) Technical Specification.

A PoC communication session is a session connection between end users of a UE 302, referred to as session "participants", who communicate one at a time in a half-duplex manner. PoC communication utilizes Voice over IP (VoIP) technology which involves the communication of data packets carrying voice information. UE 302 is terminal equipment (e.g. a mobile device) which includes PoC application client software, which includes functionality of the present application but otherwise utilizes conventional techniques. IMS core 312 includes a plurality of Session Initiation Protocol (SIP) proxies and SIP registrars. The first point of contact for UE 302 is one of the proxies in IMS core 312 that is configured on UE 302 as the outbound proxy. In the IMS architecture, the outbound proxy is known as the Proxy-CSCF (P-CSCF). IMS Core 312 performs the following functions: (1) routing of SIP signaling between UE 302 and PoC server 304; (2) termination of SIP compression from UE 302; (3) authentication and authorization; (4) maintenance of the registration state and the SIP session state; and (5) reporting to the charging system. UE 302 sends all its SIP messages to the IP address of the outbound proxy after resolving the SIP Uniform Resource Identifier (URI) of the outbound proxy to an IP address.

End users use GLMS 308 to manage groups, contact lists, and access lists. A contact list is a type of address book that may be used by end users to establish an instant talk session with other PoC users or PoC Groups. An end user may have one or several contact lists including identities of other PoC users or PoC groups. Contact list management includes operations to allow UE 302 to store and retrieve the contact lists located in GLMS 308. End users can define PoC groups. An end user may select one group from the list to initiate an instant group talk session or a chat group talk session, depending on the type of group. An access list is used by the end user as a means of controlling who is allowed to initiate instant talk sessions to the end user. An access list contains end user defined identities of other end users or groups. The end user may have one blocked identities list and one granted identities list.

PoC server 304 includes functionality to perform the PoC service. PoC Server 304 typically performs functions such as: (1) end-point for SIP signaling; (2) end-point for real-time transport protocol (RTP) and RTP Control Protocol (RTCP) signaling; (3) SIP session handling; (4) policy control for access to groups; (5) group session handling; (6) access control; (7) do-not-disturb functionality; (8) floor control functionality (floor control is a control mechanism that arbitrates requests, from the UEs, for the right to speak); (9) talker identification; (10) participant information; (11) quality feedback; (12) charging reports; and (13) media distribution. Presence server 310 manages presence information that is uploaded by presence user/network/external agents, and is responsible for combining the presence-related information for a certain presentity from the information it receives from multiple sources into a single presence document.

An Is interface supports the communication between UE 302 and IMS core 312. This communication includes SIP procedures which support the PoC features. The protocol for the Is interface is Session Initiation Protocol (SIP). Is signaling is transported on User Datagram Protocol (UDP). The protocols over an If interface support the communication between IMS core 312 and PoC server 304 for session control. The protocols over an It interface support the transport of talk bursts, floor control, and link quality messages between UE 302 and PoC Server 304. The protocols over an Im interface support the communication between UE 302 and GLMS 308 for the purpose of managing the groups, contact lists and access lists and Do-not-Disturb indication. HTTP/XML protocols are utilized for these purposes. The protocols over an Ik interface support the communication between PoC Server 304 and GLMS 308, enabling PoC server 304 to retrieve the groups and access lists from GLMS 308. The protocols over an Ips interface enable the uploading of the registration status from IMS core 312 to presence server 310 and the dissemination of the presence information between presence server 310 and UE 302. The protocol over an Ipl interface enables the uploading of Do-not-Disturb status and granted/blocked access lists from GLMS 308 to presence server 310. The group identity used on the Is interface between the UE and IMS core for group talk is generated by GLMS 308.

Each entity in the PoC system is assigned one or more IP addresses belonging to public or private IP realms. On the other hand, a end user may address another user by a phone number. UE 302 sends a phone number to IMS core 312 in a TEL Uniform Resource Locator (URL). The phone number may use the international E.164 format (prefixed with a '+' sign) or a local format using a local dialing plan and prefix.

IMS core 312 interprets the phone number with a leading '+' to be an E.164 number. Addressing by TEL URL for a PoC session requires that PoC Server 304 can resolve the TEL URL to a SIP URI, for instance by using DNS/ENUM or other local data base. A phone number in a local format is converted to the E.164 format before DNS/ENUM is used.

End users may initiate PoC talk sessions. An INVITE request on the Is interface contains an "Accept-Contact" header with a media feature tag indicating the PoC service. IMS core 312 is able to identify the request as a PoC communication by inspecting the Accept-Contact header. A Request-URI of the INVITE contains either the pre-configured ad-hoc identity (for instant personal talk and ad-hoc instant group) or a group identity (for instant group talk or chat group talk). Early session establishment is used for having a session available for quick connection establishment using "REFER". The early session establishment's INVITE does not have any referred party field and can be differentiated from this against other INVITEs. A transient group identity is generated by PoC server 304 and distributed to UE 302 in the "Contact" header. From an initiating UE 302, the public user identity of the inviting user is included in the "From" header. On the signaling towards the invited user, the "From" header includes either the public user identity (instant personal talk, ad-hoc instant group) or the group identity (instant group talk or being added to a chat group).

FIG. 4 is an illustrative representation of a plurality of message slots 400 for the communication of messages to a mobile device over any suitable channel in the wireless network, such as a paging channel (PCH). The plurality of message slots 400 include a plurality of assigned quick paging channel (QPCH) slots 401 and a plurality of assigned paging slots 402 for the mobile device. The limited viewing in FIG. 4 illustrates that assigned QPCH slots 401 include QPCH slot 404 and QPCH slot 408, and assigned paging slots 402 for the mobile device include paging slots 406 and 410. These paging slots are regular or periodic, and separated in time by a fixed time period. All other paging slots in between the assigned paging slots 402 shown in FIG. 4 are not assigned to the mobile device, and provide time periods during which the mobile device may operate in a sleep mode or perform other transceiver operations.

In CDMA communications defined by IS-2000, the quick paging channel is utilized to provide an early indication to the mobile device of whether or not a page message will be present in an upcoming paging slot assigned to the mobile device. The quick paging channel paging indicator is relatively short in comparison to the upcoming paging slot, so if the indication indicates that no page message will be present, the mobile device does not have to monitor the upcoming paging slot. As apparent, the quick paging channel indication is intended to save power at the mobile device, which no longer has to always repeatedly monitor each assigned paging slot for a page. If the mobile device determines that the quick paging channel indication may be inaccurate, the mobile device will still monitor its associated upcoming paging slot.

The wireless network utilizes an ON-OFF keying technique on the quick paging channel. When a relatively large number of mobile devices are operating in the network, indication "collisions" are more likely which causes the quick paging channel indication to become less accurate for use in the mobile device. This causes all mobile devices in the network to have to monitor the paging slots more often. In brief, the more mobile devices utilizing the quick paging channel in the network, the more likely there will be collisions to render any given quick paging channel indication to be inaccurate, and therefore the more likely mobile devices in the network will have to monitor paging slots which increases power consumption for the mobile devices. Also note that the quick paging channel is provided about 100 milliseconds before the upcoming paging slot for the mobile device. The network must therefore provide the indication and then delay 100 milliseconds prior to actually sending any page message to the mobile device. Thus, this increases the time for the network to send certain page messages to the mobile device, which increases call setup time for the mobile device. Thus, when a page message request 412 within the wireless network is received at a point in time indicated in FIG. 4, the wireless network can not always provide a page message within the next assigned paging slot 406. Rather, the wireless network may have to delay until it can provide a quick paging indication 414 within quick paging channel slot 408 so that a page message 414 may be provided within assigned paging slot 410.

FIG. 5 is an illustrative representation of the plurality of message slots 400 of FIG. 4 for the communication of messages to the mobile device, using a quick paging channel (QPCH) termination indication 504 associated with the mobile device. QPCH termination indication 504 associated with the mobile device is utilized within the wireless network to terminate use of the quick paging channel for the mobile device. Specifically, QPCH termination indication 504 is sent from the mobile device to the wireless network and instructs the wireless network to refrain from providing any QPCH indications within assigned QPCH slots 401 for the mobile device. QPCH termination indication 504 may be as simple as a binary indication or a bit flag, where '1'=QPCH usage and '0'=terminate QPCH use, or alternatively more sophisticated data.

When a mobile device is utilizing a high capacity power source different than its normal battery source, it sends QPCH termination indication 504 to the wireless network. QPCH termination indication 504 instructs the wireless network to stop utilizing the quick paging channel for the mobile device. The high capacity power source could be, for example, an AC wall power source or charger, a battery charger, a computer power source via Universal Serial Bus (USB), etc. When utilizing such a power source, the mobile device does not have a strong need to conserve power.

Since the wireless network no longer has to delay for the next available QPCH slot (e.g. QPCH slot 408) once receiving page message request 412, the wireless network may provide page message 414 within assigned paging slot 414 (and not assigned paging slot 410 referring back to FIG. 4). Thus, the mobile device may experience decreased call setup times. This may be advantageous whether the mobile device is operating in a PTT mode or a normal (non-PTT) call mode. Also, the potential for collisions of QPCH paging indications are reduced in the wireless network, which may decrease power consumption for all mobile devices in the network.

Figure 6:
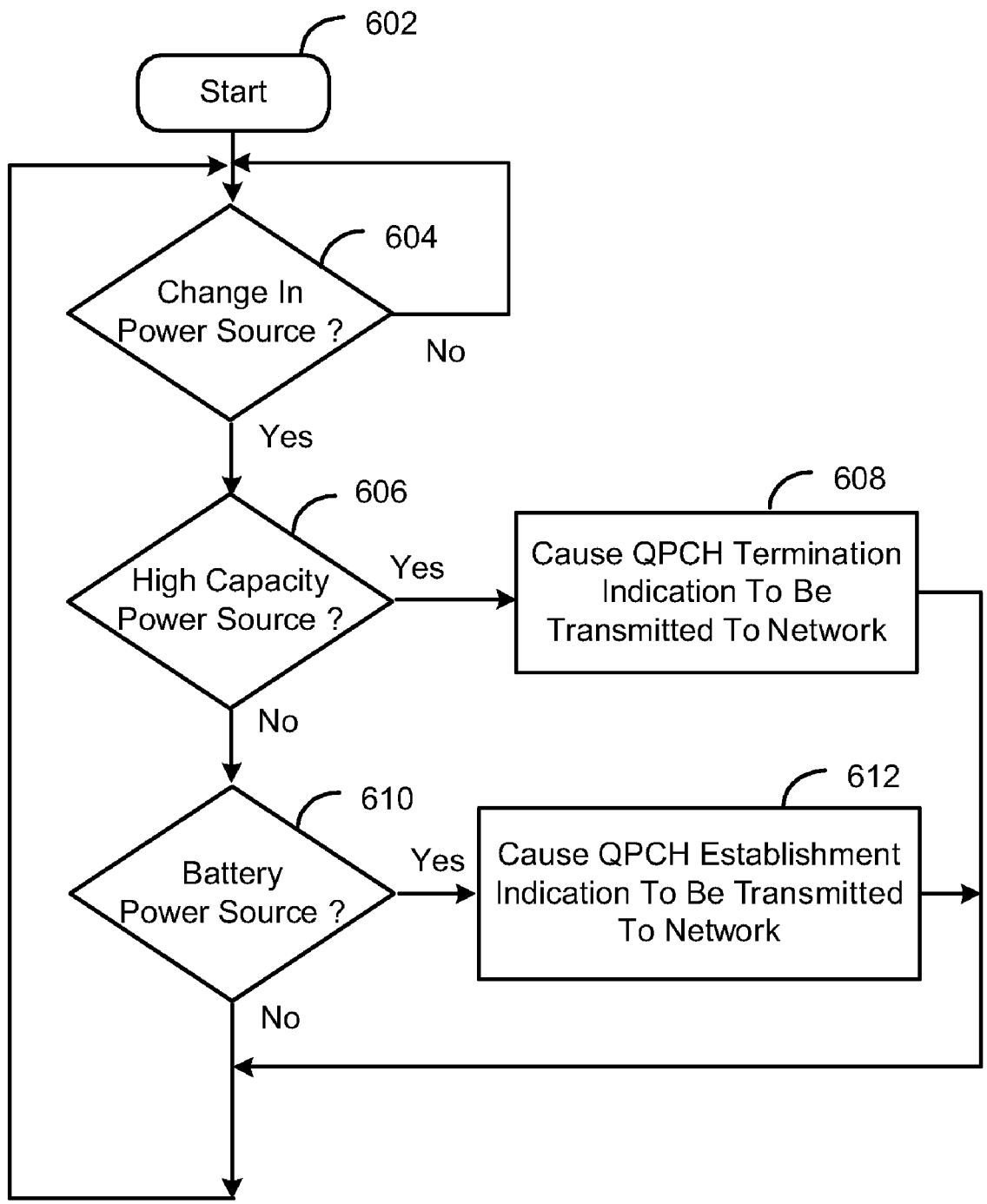
FIG. 6 is a flowchart for describing a mobile device method of terminating use of a quick paging channel for the mobile device based on high capacity power source usage.

FIG. 6 is a flowchart for describing a mobile device method of terminating use of the quick paging channel based on high capacity power source usage. The method of FIG. 6 is performed by a mobile device operating in a wireless network (e.g. see FIGS. 1-2). As described in relation to FIGS. 1-2, the mobile device may include a wireless transceiver, an antenna coupled to the wireless transceiver, a power source interface, and one or more processors coupled to these components and operative to perform the acts of the method. Also, a computer program product of the present application may include computer instructions stored on a storage medium (memory, a floppy disk or CD-ROM) which are written in accordance with the described logic.

Beginning at a start block 602 of FIG. 6, the mobile device identifies whether a change in the power source at the power source interface has occurred (step 604 of FIG. 6). This may be done by detecting any suitable electrical signal using any suitable means via the power source interface. The mobile device continues monitoring if no power source changes have occurred. If a power source change has been detected at step 604, the mobile device identifies whether the current power source is a high capacity power source (step 606 of FIG. 6). The high capacity power source could be, for example, an AC wall power source or charger, a battery charger, a computer power source via Universal Serial Bus (USB), etc. If the power source is a high capacity power source as identified in step 606, then the mobile device will cause a quick paging channel termination indication to be transmitted to the wireless network (step 608 of FIG. 6). This instructs the wireless network to refrain from providing any QPCH page indications for the mobile device on the quick paging channel. If the power source is not a high capacity power source as identified in step 606, then the mobile device identifies whether the current power source is a battery or battery pack power source (step 610 of FIG. 6). If the power source is a battery or battery pack as identified in step 610 (meaning that the high capacity power source has been disconnected from the mobile device), then the mobile device causes a quick paging channel (re-) establishment indication to be transmitted to the wireless network (step 612 of FIG. 6). This instructs the wireless network to provide QPCH page indications for the mobile device on the quick paging channel. The method repeats starting again at step 604.

Preferably, each QPCH indication (termination or establishment) is sent from the mobile device to the wireless network in a message used for registration. The message used for registration may be, for example, a parameter change registration, a timer-based registration, or an implicit registration (e.g. an origination message, a page response message, etc.). Various types of registrations and messages used for these registrations are known to those ordinarily skilled in the art and are well-documented in standards, including IS-2000 and its revisions. The mobile device may cause the indications to be sent immediately in steps 608 and 612. Alternatively, the indications in steps 608 and 612 may be sent on a deferred or delayed basis.

In one embodiment, the mobile device waits until there is an additional need or requirement to send a registration message to the wireless network different from that of the QPCH indication. For example, the mobile device may delay until a parameter change registration for updating a different parameter needs to be sent to the wireless network. As another example, the mobile device may delay for a known time period until a timer-based registration needs to be sent to the wireless network. As yet another example, the mobile device may delay until an implicit registration (e.g. origination message or page response message) needs to be sent to the wireless network. This is advantageous as the mobile device conserves power in not sending excessive numbers of messages used for registration to the wireless network.

Even more preferably, the mobile device determines whether or not it is more efficient to send the QPCH indication within a separate current message used for registration or an expected or anticipated message used for registration. The mobile device ultimately sends the indication within the selected registration message that provides the greater power savings advantage to the mobile device. For example, the expected message used for registration may be for a timer-based registration where the time period before sending the timer-based registration message is known. The mobile device may identify or determine which operation is most efficient: sending the separate (current) message used for registration or waiting until the time period associated with the timer-based registration expires. For the separate message used for registration the estimated power consumption is the estimated power consumption to send the separate message used for registration. For the timer-based registration the estimated power consumption is the estimated power consumption of failing to utilize the QPCH on a per slot basis multiplied by the number of slots over the time period. These estimated power consumptions are compared and the one with the best savings is selected. Note also that the effectiveness of the quick paging channel depends on the location of the mobile device relative to the base station. If the mobile device is relatively close to the base station then the quick paging channel is effective; if the mobile device is relatively far from the base station then the quick paging channel is less effective. Furthermore, if the mobile device is relatively close to the base station then it will take less power to transmit the separate message used for registration than if the mobile device is relatively far from the base station. The mobile device may take this information into account in determining whether or not it is more efficient to send the QPCH indication within a separate current message used for registration or an expected or anticipated message used for registration. For example, if the quality of the quick paging channel is identified to be poor, the mobile device may refrain from sending the indication in a current separate registration message and wait for the expected registration message. The mobile device may judge the quality of the quick paging channel, for example, based on the strength of the pilot channel of the base station that is transmitting on the quick paging channel.

FIG. 7 is a flowchart for describing a mobile device method of operating based on the QPCH monitoring mode. Again, the method of FIG. 7 is performed by a mobile device operating in a wireless network (e.g. see FIGS. 1-2). As described in relation to FIGS. 1-2, the mobile device may include a wireless transceiver, an antenna coupled to the wireless transceiver, and one or more processors coupled to these components and operative to perform the acts of the method. Also, a computer program product of the present application may include computer instructions stored on a storage medium (memory, a floppy disk or CD-ROM) which are written in accordance with the described logic. Note that, for the purposes of FIG. 7 discussion, the mobile device places itself in "sleep modes" of operation (low power states) when it is not monitoring and receiving information on any paging channel.

Beginning at a start block 702, the mobile device identifies whether it is operating in a quick paging channel (QPCH) monitoring mode (step 704 of FIG. 7). The mobile device is operating in the QPCH monitoring mode if it submitted a QPCH termination indication earlier to the wireless network; conversely the mobile device is not operating in the QPCH monitoring mode if it submitted a QPCH establishment indication earlier to the wireless network. The mode may change based on the method described earlier in relation to FIG. 6. If the mobile device is not operating in the QPCH monitoring mode as identified in step 704, then it refrains from monitoring the quick paging channel and proceeds to step 710. If the mobile device is operating in the QPCH monitoring mode as identified in step 704, then the mobile device will monitor its designated location(s) within the upcoming assigned quick paging channel slot (step 706 of FIG. 7). After step 706, the mobile device then identifies whether a QPCH page indication was identified on the quick paging channel (step 708 of FIG. 7). If a QPCH page indication was identified on the quick paging channel in step 708, then the mobile device monitors the upcoming paging slot assigned to the mobile device (step 710 of FIG. 7). Proceeding to step 710 from step 708 may also occur where the confidence of reception or accuracy on the quick paging channel is very low (e.g. below a predetermined confidence level). If no QPCH page indication was identified in step 708, and the confidence of reception or accuracy of the quick paging channel is not low, then the mobile device refrains from monitoring the upcoming assigned paging slot and repeats the flowchart steps starting again at step 704.

After monitoring and receiving information within the assigned paging slot in step 710, the mobile device identifies whether a page message within the paging slot is directed to the mobile device (step 712 of FIG. 7). If a page message directed to the mobile device exists in step 712, then the mobile device processes the page message to facilitate the handling of the incoming call (voice or data call) or message (step 714 of FIG. 7) and performs steps to repeat the method starting again at step 704. If no page message is identified in step 712, then the mobile device does not process any incoming call and the repeats the method starting again at step 704.

Thus, methods and apparatus for terminating use of a quick paging channel based on high capacity power source usage have been described. In one illustrative example, a mobile communication device has a wireless transceiver; an antenna coupled to the wireless transceiver; one or more processors coupled to the wireless transceiver; and a power source interface which is adapted to connect with a power source for supplying electrical power to the mobile device. The one or more processors are operative to monitor a quick paging channel of a wireless communication network with use of the wireless transceiver; identify whether a predetermined power source (e.g. a high capacity power source) is connected to the power source interface; cause an indication to terminate use of the quick paging channel to be transmitted with the wireless transceiver to the wireless network based on identifying that the predetermined power source is connected to the power source interface; and refrain from monitoring the quick paging channel with the wireless transceiver after sending the indication to the wireless network.

A related method of conserving battery power in a mobile communication device includes the steps of identifying, at the mobile device, a condition to change a parameter in a wireless communication network; delaying for a period of time until an expected message used for registration is to be sent to the wireless network; providing the parameter within the expected message used for registration; and causing the expected message used for registration to be transmitted to the wireless network. The expected message used for registration may be a message used for timer-based registration, or a message used for parameter change in the wireless network which may include an additional parameter. Preferably, the mobile device determines whether to send the parameter in one of a current message used for registration and the expected message used for registration, based on which message would provide a greater power savings advantage, and selects one of the current message and the expected message used for registration within which to send the parameter based on the act of determining. The parameter may be or include a quick paging channel termination indication for terminating use of a quick paging channel for the mobile device. The condition to change the parameter may be based on identifying whether or not a predetermined power source coupled to the mobile device. Such related methods may be executed by one or more processors of the mobile device or embodied in a computer program product as previously described.

The above-described embodiments of the present application are intended to be examples only. For example, although use of a paging channel (PCH) is described herein, similar channels such as a forward common control channel (FCCH) may be utilized additionally or alternatively. Further, use of a page message as described herein may involve several alternatives including a General Page Message or Universal Page Message, as well as others such as a feature control message, etc. Those of skill in the art may effect alterations, modification, and variations to the particular embodiments without departing from the scope of the application. The invention described herein in the recited claims intends to cover and embrace all suitable changes in technology.

What is claimed is:

1. A method of monitoring for pages in a wireless communication network by a mobile communication device configured to operate with a battery power source, the method comprising the steps of:
   repeatedly monitoring a quick paging indication channel of the wireless network for quick page indications and, if a quick page indication is received on the quick paging indication channel, subsequently monitoring a paging channel of the wireless network for an upcoming page;
   identifying whether an external power source is connected to the mobile device;
   if the external power source is identified as being connected to the mobile device:
   causing an indication to terminate use of quick paging indications to be sent to the wireless network; and
   after sending the indication, terminating the monitoring of the quick paging indication channel for quick page indications.

2. The method of claim 1, further comprising:
   if the external power source is identified as being disconnected from the mobile device:
   causing an indication to reestablish use of quick paging indications to be sent to the wireless network; and
   after sending the indication to reestablish use of the quick paging indication channel, again repeatedly monitoring the quick paging indication channel for quick page indications.

3. The method of claim 1, wherein the external power source comprises a high capacity power source.

4. The method of claim 1, wherein the external power source comprises an AC power source or battery charger.

5. The method of claim 1, wherein the external power source comprises a computer power source via Universal Serial Bus (USB).

6. The method of claim 1, wherein the indication comprises a binary indication having a value of 0 or 1.

7. The method of claim 1, wherein the termination of use of the quick paging indication channel for the mobile device serves to reduce unnecessary page monitoring by other mobile devices in the wireless network.

8. The method of claim 1, wherein the termination of use of the quick paging indication channel for the mobile device serves to reduce power consumption for other mobile devices in the wireless network.

9. The method of claim 1, wherein the wireless communication network comprises a Code Division Multiple Access (CDMA) network.

10. The method of claim 1, which is embodied as a computer program product comprising a computer readable medium and computer instructions stored in the computer readable medium, where the computer instructions are operative by one or more processors of the mobile device for performing the method.

11. A mobile communication device, comprising:
    one or more processors;
    a wireless transceiver coupled to the one or more processors and operative for communications with a wireless network;
    a power source interface which is configured to connect with an external power source;
    the one or more processors being configured to:
    repeatedly monitor via the wireless transceiver a quick paging indication channel of the wireless network for quick page indications and, if a quick page indication is received on the quick paging indication channel, subsequently monitor via the wireless transceiver a paging channel of the wireless network for an upcoming page;
    identify whether an external power source is connected to the power source interface of the mobile device;
    if the external power source is identified as being connected to the power source interface;
    cause an indication to terminate use of quick paging indications to be sent to the wireless network via the wireless transceiver; and
    after sending the indication, terminate the monitoring of the quick paging indication channel for quick page indications.

12. The mobile communication device of claim 11, wherein the one or more processors are further configured to:
    if the external power source is identified as being disconnected from the power source interface:
    cause an indication to reestablish use of the quick paging indication channel to be sent to the wireless network via the wireless transceiver; and
    after sending the indication to reestablish use of the quick paging indication channel, again repeatedly monitor via the wireless transceiver the quick paging indication channel for quick page indications.

13. The mobile communication device of claim 11, wherein the external power source comprises a high capacity power source.

14. The mobile communication device of claim 11, wherein the external power source comprises an AC power source or battery charger.

15. The mobile communication device of claim 11, wherein the indication comprises a binary indication having a value of 0 or 1.

16. The mobile communication device of claim 1, wherein the termination of use of the quick paging indication channel for the mobile device serves to reduce unnecessary page monitoring by other mobile devices in the wireless network.

17. A method in a wireless communication network for paging a mobile communication device, the method comprising the steps of:
    when a page is intended for the mobile device: causing a quick page indication to be sent to the mobile device over a quick paging indication channel, and subsequently causing the page to be sent to the mobile device over a paging channel;
    receiving, from the mobile device, an indication to terminate use of quick paging indications in response to an external power source being connected to the mobile-device;
    terminating use of quick paging indications to the mobile device in response to receiving the indication to terminate use of quick paging indications; and
    when a page is intended for the mobile device after terminating use of quick paging: causing the page to be sent to the mobile device over the paging channel.

18. The method of claim 17, further comprising:
receiving, from the mobile device, an indication to reestablish use of quick paging indications in response to the external power source being disconnected from the mobile device;
reestablishing use of quick paging indications to the mobile device in response to receiving the indication to reestablish use of quick paging indications; and
when a page is intended for the mobile device after receipt of the indication to reestablish use of the quick paging indications: causing a quick page indication to be sent to the mobile device over the quick paging indication channel, and subsequently causing the page to be sent to the mobile device over the paging channel.

19. The method of claim 17, wherein the external power source comprises a high capacity power source.

20. The method of claim 17, wherein the external power source comprises an AC power source or battery charger.

21. The method of claim 17, wherein the indication comprises a binary indication having a value of 0 or 1.

22. A wireless communication network which is configured to provide communications for a mobile communication device, the wireless network being further configured to, when a page is intended for the mobile device, cause a quick page indication to be sent to the mobile device over a quick paging indication channel and subsequently cause the page to be sent to the mobile device over a paging channel; receive, from the mobile device, an indication to terminate use of quick paging indications in response to an external power source being connected to the mobile device; terminate use of quick paging indications to the mobile device in response to receiving the indication to terminate use of quick paging indications; and when a page is intended for the mobile device after receipt of the indication to terminate use of quick paging indications, cause a page to be sent to the mobile device over the paging channel.

23. The wireless communication network of claim 22, which is further configured to receive, from the mobile device, an indication to reestablish use of quick paging indications in response to the external power source being disconnected from the mobile device;
reestablish use of quick paging indications to the mobile device in response to receiving the indication to reestablish use of quick paging indications; and
when a page is intended for the mobile device after receipt of the indication to reestablish use of the quick paging indications, cause a quick page indication to be sent to the mobile device over the quick paging indication channel and subsequently cause the page to be sent to the mobile device over the paging channel.

24. The wireless communication network of claim 22, wherein the external power source comprises a high capacity power source.

25. The wireless communication network of claim 22, wherein the indication comprises a binary indication having a value of 0 or 1.

26. A method of monitoring for pages in a wireless communication network by a mobile communication device configured to operate with a battery power source, the method comprising the steps of:
repeatedly monitoring a quick paging indication channel of the wireless network for quick page indications and, if a quick page indication is received on the quick paging indication channel, subsequently monitoring a paging channel of the wireless network for an upcoming page in a paging slot assigned to the mobile communication device;
identifying whether an external power source is connected to the mobile device;
if the external power source is identified as being connected to the mobile device:
causing an indication to terminate use of quick paging indications to be sent to the wireless network; and
after sending the indication, repeatedly monitoring the paging channel of the wireless network for a page in the paging slot assigned to the mobile communication device.

27. The method of claim 26, further comprising:
if the external power source is identified as being disconnected from the mobile device:
causing an indication to reestablish use of quick paging indications to be sent to the wireless network; and
after sending the indication to reestablish use of the quick paging indication channel, again repeatedly monitoring the quick paging indication channel for quick page indications.

28. The method of claim 26, wherein the , external power source comprises a high capacity power source.

29. The method of claim 26, wherein the external power source comprises an AC power source or battery charger.

30. The method of claim 26, wherein the external power source comprises a computer power source via Universal Serial Bus (USB).

31. The method of claim 26, wherein the indication comprises a binary indication having a value of 0 or 1.

32. A mobile communication device, comprising:
one or more processors;
a wireless transceiver coupled to the one or more processors and operative for communications with a wireless network;
a power source interface which is configured to connect with an external power source;
the one or more processors being configured to:
repeatedly monitor via the wireless transceiver a quick paging indication channel of the wireless network for quick page indications and, if a quick page indication is received on the quick paging indication channel, subsequently monitoring via the wireless transceiver a paging channel of the wireless network for an upcoming page in a paging slot assigned to the mobile communication device;
identify whether the external power source is connected to the power source interface;
if the external power source is identified as being connected to the power source interface:
cause an indication to terminate use of quick paging indications to be sent to the wireless network via the wireless transceiver; and
after sending the indication, repeatedly monitor via the wireless transceiver the paging channel of the wireless network for a page in the paging slot assigned to the mobile communication device.

33. The mobile communication device of claim 32, further comprising:
  if the external power source is identified as being disconnected from the mobile device:
   causing an indication to reestablish use of quick paging indications to be sent to the wireless network; and
   after sending the indication to reestablish use of the quick paging indication channel, again repeatedly monitoring the quick paging indication channel for quick page indications.

34. The mobile communication device of claim 32, wherein the external power source comprises a high capacity power source.

35. The mobile communication device of claim 32, wherein the external power source comprises an AC power source or battery charger.

36. The mobile communication device of claim 32, wherein the external power source comprises a computer power source via Universal Serial Bus (USB).

37. The mobile communication device of claim 32, wherein the indication comprises a binary indication having a value of 0 or 1.

* * * * *